Jan. 15, 1963 S. R. BARNETTE 3,072,973

METHOD OF MAKING CAST PLASTIC LAMINATES

Filed April 24, 1959

Inventor
STANLEY R. BARNETTE

By
Kemmel & Crowell
ATTORNEYS

United States Patent Office 3,072,973
Patented Jan. 15, 1963

3,072,973
METHOD OF MAKING CAST PLASTIC LAMINATES
Stanley Ronald Barnette, 90 Cherokee St., Miami Springs, Fla.
Filed Apr. 24, 1959, Ser. No. 808,599
6 Claims. (Cl. 18—59)

The invention relates to a method of forming articles of laminated plastic by a casting process which includes having the articles in any desired shape or form and with plain or decorative surfaces and/or plain or decorative embedments.

The invention contemplates the method of enveloping a core stock whereby to attain a product having bulk without excess weight and with full strength characteristics.

An object of the invention is to provide a means of forming cast laminated sheeting and surfacing material wherein the laminations are cast in layers, with or without a decorative material, and, also, completely surrounding a core stock by means of an enveloping by plastic material that hardens with cure processes.

The invention also relates to a method of cast laminating pearlized, plain, or patterned decorative sheeting and enveloping a core stock material so as to achieve a structural surfacing material and particularly to such methods utilizing plastic.

Another object of the invention is to provide a method wherein the cast laminated material is provided with an extremely smooth or embossed effect, relatively hard surface.

A further object of the invention is to provide a method wherein the core material is completely surrounded by plastic and adds materially to the strength of the finished itemed product.

Other objects and advantages will become apparent in the following specification when considered in the light of the attached drawings, in which.

Figure 1:
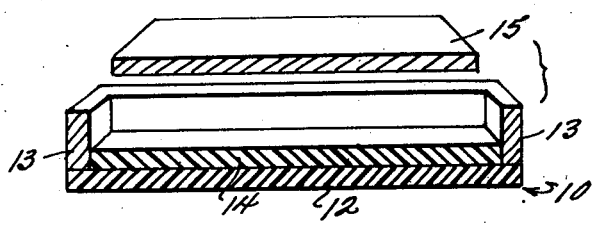
FIGURE 1 is a perspective view shown partially in section of one step of the process.

In practising the method of the instant invention, a mould base, such as that illustrated at 10 in FIGURE 1, having a bottom 12 and upstanding sides 13 are coated with a release comprising a mixture of 25 parts lechithin and 75 parts of mineral spirits.

In the event an embossed effect is desired, embossed sheeting of polyester film can be used and no coating is necessary as this material in itself acts as a ready release.

Any thermosetting or thermoplastic resinous material or matter which hardens with cure or setting, such as epoxy, polyester, styrene, methyl-methacrylate or any others, can be used in formulating the cast laminated sheeting and enveloping processes. However, for descriptive purposes in respect to the methods used, the polyester thermosetting variety formulation is used in this description. If thermoplastics are used, the described method will vary in that instead of the air cure, controlled direct heat at a temperature sufficient to harden or solidify the thermoplastic, but insufficient to reliquefy the same is employed. This temperature will vary with various substances, but normally will range from 100° F to 140° F.

It should be noted that the mould base, as shown in FIGURE 1, is a glass or melamine type and after same has been coated, and carefully wiped clean, the polyester variety of thermo-setting resin plastic is poured into the mould to a registered depth, as is outlined on the wall illustrated at 13 in FIGURE 1. In one example of cast lamination made under this method, the required amount of plastic is dependent upon the thickness and/or decorative medium to be covered and will vary considerably. However, to describe a relatively simple patterned sheet and enveloping process, a 48" round mould is readied and coated with the release. Six quarts of the selected resin, 3 ozs. of pearl essence, 3½ ozs. of MEK-peroxide, ¼ oz. of cobalt, and ½ quart of purified styrene is the total necessary for the chemical mixture. The resin, pearl essence, cobalt, and purified styrene are mixed in one container and 2½ quarts of resin is poured into a separate container to which 2 ozs. of the MEK-peroxide is stirred. The latter is then poured into the mould and to achieve a highly pearlescent effect, same is mottled by hand by means of combing the liquid in swirled effects. In about 5 minutes, which will fluctuate dependent upon the room temperature being used, the mass will thicken and commence to "jell." At this point 1 quart of the resin is mixed with ¾ oz. of the MEK-peroxide and poured into the mould as a secondary cast lamination. The plastic in the mould is then permitted to level itself and a core stock, whether wood, plywood, particle board, honeycomb, foamed plastic or any other filler, is placed into the mould. This core was ¾" thick to achieve, in this instance, a 1" stock, and had been previously turned down ¼" narrower than the mould rim. Within one hour, or somewhat less, the remainder of the resin, which is 2½ quarts, is stirred with the remaining ¾ oz. of MEK-peroxide and poured on top of the core material. A level rule is used to push the fluid into the rim cavity.

Approximately 3 hours maximum time is required for the plastic to set so as to be able to remove it from the mould.

Figure 2:
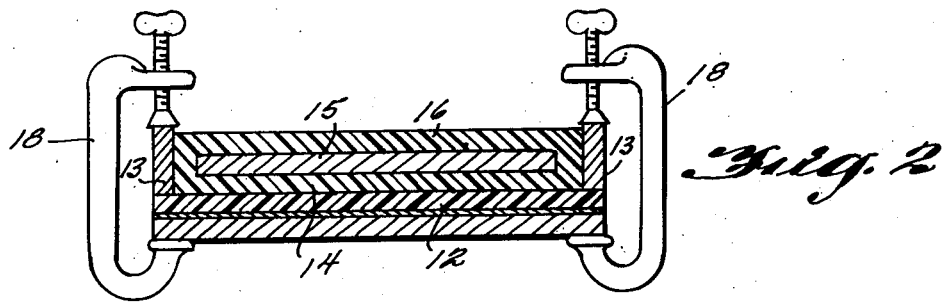
FIGURE 2 is a sectional view similar to FIGURE 1, illustrating another step of the process.
Figure 3:
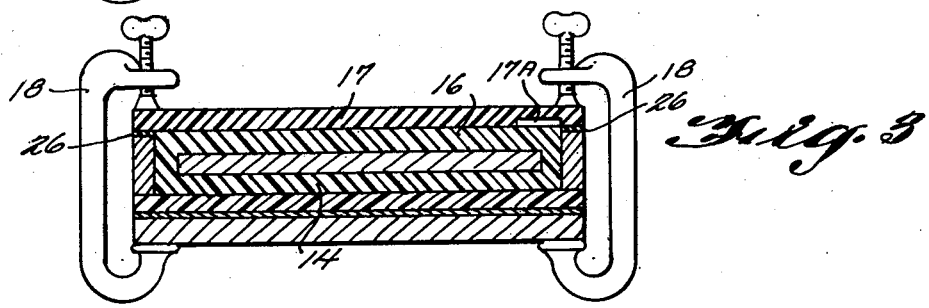
FIGURE 3 is a sectional view similar to FIGURE 2, which has the top of the mold in place illustrating a step in the process to produce smooth sides at the top and on the bottom.

The above description closely describes that sectional view as appears in FIGURE 2 and it should be noted that the lower face of the casting 14 will have an extremely smooth crystal clear surface, namely the side immediately on the face of the mould. Should two extremely smooth in appearance sides on the casting 16 be desired, it will be noted that in FIGURE 3, a top face mould 17 has been added. This procedure in the latter event is as follows:

The layer of plastic 16 in FIGURE 2 must remain in the "tacky" stage, not too thin so as to run, but yet not so hard as not to permit adhesion to the additional lamination. The clamps 18 in FIGURE 2 are removed and a gasket 26 is placed in a stripping immediately over walls 13 in FIGURE 2 to prevent the liquids from leaking when the mould is filled. A tempered plate glass 17, or other face moulding as required, is then placed on the gasket 26 and the clamps 18 are reset to hold, as indicated in FIGURE 3. The entire mould is then tilted to a 45° angle to enable a filler resin to be poured into a slot 17A which has previously been machined in the mould in preparation to pour the liquid into the mould. Some may prefer to pour into the slot by turning the mould upside down so as to guarantee the liquids will remain on the face until cured. However, it can be achieved in either method and whichever is more handy in the operation. When the entire mould cavity has been filled and any remaining air bubbles have been allowed to release, the mould can be restored to the horizontal position and stored for cure. To produce a flat sheet without a core and to have flexibility in the sheet, omit the core and substitute a mixture of flexible polyester resins.

The above described cast lamination will be of a natural pearl color which is a greyish white tone. Various tinted pigments can be added for the desired effects in color wanted.

Another example will be given which more clearly indicates the dimensional effects that may be achieved in this cast lamination process. It should be noted that this formulation is used as an example dependent upon the effect of dimension desired and, also, the thickness of the embedments themselves and the amount of liquids necessary to completely cover. However, still using a 48" round mould, the required materials would include a total of 384 ozs. thermosetting resin, 7 ozs. purified styrene, 3⅔ ozs. MEK-peroxide, ½ oz. cobalt, 2½ ozs. pearl essence, and 1 oz. pigmented white polyester paste, and 10 drops of blue pigmented polyester color and paste tint. Of the above, 5½ qts. of the resin (176 ozs.) is mixed with ¼ oz. of the cobalt and 10 drops of the tinted blue paste. This amount is placed in readiness so as not to lose control in between the cast laminations that the various layers must be placed at the proper "jell" time to assure adherence of the layers. Of the total quantity stated, 2 quarts (64 ozs.) of the plastic is mixed with 7 ozs. styrene and 1 oz. of MEK-peroxide which is poured into the mould and leveled to the edges by hand operation. In approximately 15 minutes, the mass will begin to "jell," at which time 2 quarts (64 ozs.) from the stated total of resin is mixed with ½ oz. MEK-peroxide and testing to see that the mass is still jelled yet not hard, this mix is poured into the mould and leveled to the edges. At this time various decorative media, such as dried leaves, mother of peal flakes, metallic thread and the like, are placed in a formed pattern therein. These patterns can almost be exact in that there will be no movement of the placed items. Placing the items requires approximately 10 minutes for a 48" size layout, at the end of which time a quart of the total amount of the clear resin is added mixed with a ⅓ oz. of the MEK-peroxide. There is remaining 16 ozs. of the clear resin from the original total amount to which ½ oz. of pearl essence is added, awaiting the last layer to "jell."

In about 20 minutes the base coat should be sufficiently jelled to permit the addition of the said 16 ozs. of clear resin mixed with pearl essence and to which ½ oz. of MEK-peroxide is added, kept agitated so as not to settle, stirred and brushed on the clear base in the mould. While this brush coat is setting, 6½ quarts (208 ozs.) of the total resin is mixed with 2 ozs. of pearl essence and ¼ oz. cobalt in readiness. At this stage, and approximately 5 minutes after completing the pouring of the last addition, 2 quarts of the resin (64 ozs.) is mixed with 1 oz. of pigmented white and ⅓ oz. of MEK-peroxide. It is stirred well and upon testing tackiness of the "jell," pour this amount into the mould and level to the edges of the mould. In approximately 10 minutes, the white pigmented resin should have jelled to the proper consistency, still in the tacky stage, so that the core filler will be added. At any time within an hour, the remaining 4½ quarts mixed with 1 oz. of the MEK-peroxide is poured on the core and smoothed to the edges of the mould and into the cavity. This last 4½ quarts resin can either be tinted, pearlized or embedments added directly to the resin so that when solidified it will have a designed wall and back surface. In approximately 3 hours time, the plastic is set so as to be able to be removed from the mould. As is the case of the previous description, this casting will have only one extremely smooth surface, unless the procedure of FIGURE 3 is followed.

I have discovered that the addition of the tinted blue paste makes the casting come out clear, whereas otherwise it would be amber or pinkish.

In FIGURE 1 of the drawings, the plastic first poured into the mould 10 is indicated at 14 with the core 15 about to be placed in the mould 10. In FIGURE 2, the plastic 14 is shown supporting the core 15 and additional plastic 16 is engaged thereover. The mould wall is secured to the base by clamps 18.

In FIGURE 3 the plastic 14 is shown supporting the core 15 and additional plastic 16 is engaged thereover with an upper mould plate 17 secured thereagainst by clamps 18.

Figure 4:
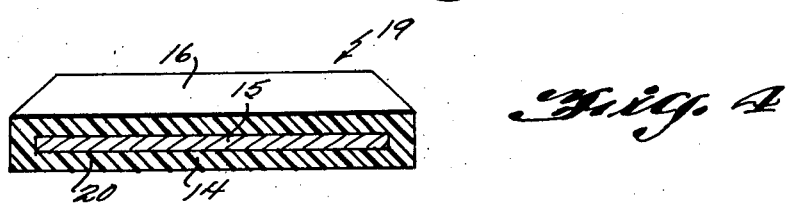
FIGURE 4 is a perspective view of the product, partially in section, after it has been cast laminated.

FIGURE 4 shows a finished product, at 19 showing the core 15 completely surrounded by solidified plastic 20.

The mould 10 and the upper mould plate 17 can be made of glass or plastic to obtain a highly polished surface on that face of moulded article 19.

Figure 5:
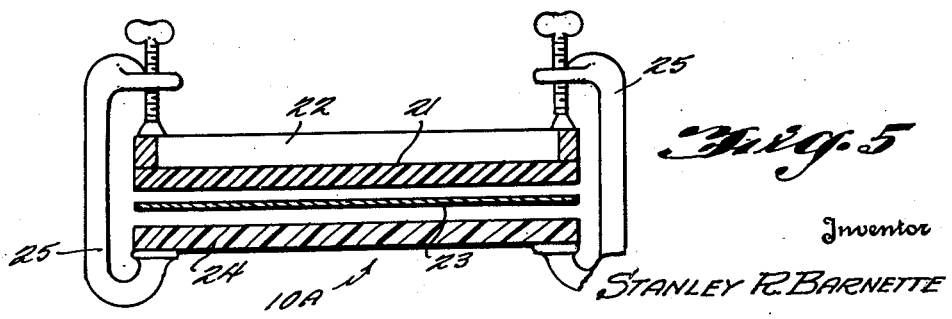
FIGURE 5 is a sectional view of a modified mould structure.

In FIGURE 5, a modified form of the mould 10 is illustrated at 10A and comprises a relatively flat mould base 21 having a retaining wall 22 fixedly secured thereto. A metal foil blanket 23 is positioned beneath the mould base 21 and a leveled platform 24 is secured to the mould base 21 by clamps 25 with the heat-retaining metal foil blanket 23 "sandwiched" therebetween.

It should be understood that following the method and principles of the invention above disclosed that table tops, decorative panels, wall panels, as well as structural surfacing material of various kinds, may be formed.

It will be noted from the foregoing description that I have provided as an article of manufacture, a cast plastic sheet suitable for many uses, such as, for example, but not limited to table tops, and that said sheet has considerabel bulk or as much bulk as may be desired, without any greater weight than that of the plastic, the bulk being provided to the extent desired by an insert or core which is so embedded and in effect welded to the plastic material which surrounds it as to be integral. The cores can be of a wide variety and as light or as heavy as desired. The method or process of production is such that the sheet produced, whether with or without a core or filler, can be wholly or partially transparent and of any desired variety or mixtures of colors. By suitable embedments either per se or in addition to the core or filler, any number of beautiful designs and decorative motifs can be had. The method involves what I call cast laminating in that I produce the completed articles by a series of pours in such manner that each layer becomes integral with a preceding layer, instead of merely a series of independent sheets or common laminations merely each individually bonded to the other. Furthermore, if a specific embedment in an exact position is desired to be seen through the plastic, such embedment can be placed with exactitude as the layer of plastic on which it is placed is at that time in a stickey or tacky state, that is, it has not completely jelled and hardened. The several plastic materials mentioned are of either the thermosetting or of the thermoplastic type as may be desired, and those listed are by way of illustration. The thermosetting type has been given in the examples of compounds and methods of procedure as they are generally preferable for certain purposes. However, the thermoplastics can be employed, with the application of controlled direct heat sufficient to solidify the thermoplastic, but not sufficient to reliquefy the same at various stages of the process. In the use of the thermosetting plastics, my process can be speeded up, if desired, by the application of oven heat or heat from some suitable source, such as infra-red lamps or hot water.

The simple mould forms are of the melamine (Formica covered plywood) type as they can be very readily shaped to provide the desired side wall contours of the mould.

It is important to observe that in casting a laminated sheet comprising a lamination of, for example, wood or composition board and plastic, the insert must be covered on both sides by equal thicknesses of the outer plastic laminations to avoid warpage of the completed product.

What I claim is:

1. The method of producing balanced warp free rigid structural core enveloped molded articles which comprises pouring a predetermined quantity of liquid resin comprising a mixture of liquid catalyzed modified resin into a leveled shallow open mold, having a bottom conforming to the desired exterior surface finish of the article, to a partial depth of the mold, and permitting the liquid resin to cure, pouring at least one additional quantity of said liquid catalyzed modified resin on top of the last cured plastic and positioning a substantially rigid core stock slightly narrower than the mold rim into the said liquid resin, said core displacing said resin so as to permit the resin to rise through, permeate the edges and flow onto the top surface of the core, adding additional catalyzed modified liquid resin to completely envelope the core by a substantially identical thickness of resin to equal that amount of said plastic which is on the opposite and finished surface side of said core and permitting said resin to cure until set, forming a structural integrally balanced seamless structural surfacing material with a finished surface.

2. The method of producing balanced warp free rigid structural core enveloped molded articles which comprises pouring a predetermined quantity of liquid plastic comprising a mixture of catalyzed modified resinous liquid into a shallow open mold, having a bottom conforming to the desired exterior surface finish of the article, to a partial depth of the mold, and permitting the said liquid resin to cure, pouring at least one additional quantity of catalyzed modified resin on top of the last cured plastic and positioning a substantially rigid core slightly narrower than the mold rim into the said liquid resin, said core displacing the said liquid resin so as to permit the resin to rise through, permeate the sides and flow around the core and permitting said resin to cure, fitting a top mold cover to the existing mold form, the underside of which conforms to the desired exterior surface finish of the article to provide a predetermined space cavity to balance with that of the opposite face side, tilting the mold and introducing into the mold, sufficient catalyzed modified resinous liquid to fill the cavity, permitting the air to escape through an uppermost slot, plugging the slot and permitting said resin introduced into said cavity to cure until set, forming a structural integrally balanced seamless surfacing material with two exterior finished surfaces.

3. The process of making a balanced warp free rigid structural core enveloped molded decorative article having an ornamental surface appearance comprising the steps of pouring a predetermined quantity of a transparent liquid catalyzed modified resin into a shallow open top mold having a bottom conforming to the desired exterior surface finish of the article, to a partial depth of the mold, permitting said liquid resin to solidify to a cured condition, adding at least one other quantity of liquid transparent catalyzed modified resin and by hand means mottling decorative media therein the said liquid transparent resin in an exact pattern layout of choice, to impart a reverse decorative design thereto visible through the outer face of the completed plastic article when removed from the mold, permitting said quantity of liquid resin to harden, adding a quantity of liquid pigmented catalyzed modified resin and permitting said quantity of liquid pigmented catalyzed modified resin to harden, pouring an additional quantity of liquid pigmented catalyzed modified resin and centering a substantially rigid core of slightly narrower dimension than the mold rim into the said liquid resin to surround, cover, and completely envelope the core by a substantially identical thickness of resin to equal that amount of cured plastic which is on the opposite and finished surface side of said core and permitting said resin to cure until set, forming an integrally balanced seamless decorative surfacing material with a finished surface, and having the general appearance of a solid plastic article.

4. A method of forming a balanced warp free structural plastic article in a plurality of self bonding layers and having a structural core therein comprising pouring a predetermined quantity of a pigmented catalyzed liquid resin into a shallow open top mold having a bottom conforming to the desired exterior surface finish of the article and, permitting said liquid resin to cure, pouring at least one other quantity of a pigmented catalyzed liquid resin on top of said cured plastic, positioning a substantially rigid core stock of narrower dimension than said mold into one of said quantities of liquid resin, completely surrounding, and enveloping said core by a substantially identical thickness of resin to equal that amount of said plastic which is on the opposite and finished surface side of said core with a pigmented catalyzed liquid resin and permitting said resin to cure until set, to form a seamless integrally balanced structural surfacing material.

5. The method of producing balanced molded plastic sheeting articles which comprises pouring a predetermined quantity of catalyzed modified liquid resin into a shallow open mold having a bottom conforming to the desired exterior surface finish of the article, to a partial depth of the mold and permitting the liquid resin to solidify to a cured condition, adding at least one substantially identical quantity of pigmented liquid resin, and by hand means mottling decorative media therein and permitting said resin to cure and set, to form an integrally seamless and balanced decorative sheeting.

6. The method of producing a molded plastic article which includes the steps of adding pigmented coloring to a liquid resin comprising a liquid catalyzed modified resin, pouring a predetermined quantity of said liquid resin into a shallow open mold having a bottom conforming to the desired exterior surface finish of the article, mottling decorative media therein said liquid resin by hand means in a combing motion pattern to diffuse the pigmented coloring into an asymmetrical deep dimensional effect and permitting said liquid plastic to cure, adding at least one further quantity of a pigmented catalyzed liquid modified resin of substantially identical quantity to the first poured liquid resin and permitting the said quantities of resin to cure and set, to form a molded integrally balanced and seamless decorative sheeting.

References Cited in the file of this patent

UNITED STATES PATENTS

| | | |
|---|---|---|
| 1,764,009 | Embree | June 17, 1930 |
| 1,827,549 | Villain | Oct. 13, 1931 |
| 2,244,565 | Nast | June 3, 1941 |
| 2,300,495 | Gerhart | Nov. 3, 1942 |
| 2,428,977 | Mares | Oct. 14, 1947 |
| 2,480,750 | Leary | Aug. 30, 1949 |
| 2,592,258 | Economakis | Apr. 8, 1952 |
| 2,822,636 | Shreedharan | Feb. 11, 1958 |
| 2,920,350 | Hosch | Jan. 12, 1960 |

FOREIGN PATENTS

| | | |
|---|---|---|
| 167,676 | Australia | May 14, 1956 |

OTHER REFERENCES

Rohm and Haas, "Embedding Biological Specimens in Acrylic Plastic," August 1947.

"Methyl Methacrylate as Imbedding Agent," Halenz et al., Journal of Chemical Education, vol. 19, July 1942.

Plastics Engineering Handbook, Society of the Plastics Industry, Inc., 1954.